United States Patent [19]

Beres

[11] 4,137,664
[45] Feb. 6, 1979

[54] FISHING SINKER
[76] Inventor: William J. Beres, 142 Luther Ave., Hopelawn, N.J.
[21] Appl. No.: 760,537
[22] Filed: Jan. 19, 1977
[51] Int. Cl.² ............................................ A01K 95/00
[52] U.S. Cl. ...................................................... 43/43.1
[58] Field of Search .................. 43/43.1, 44.89, 43.15, 43/44.87, 44.9

[56] References Cited
U.S. PATENT DOCUMENTS

| | | | |
|---|---|---|---|
| 484,254 | 10/1892 | Settle | 43/43.1 |
| 2,983,068 | 5/1961 | Grayson | 43/44.89 |
| 3,911,610 | 10/1975 | Goodman | 43/43.1 |

FOREIGN PATENT DOCUMENTS 556508  4/1958  Canada ...................................... 43/44.9

Primary Examiner—Russell R. Kinsey
Assistant Examiner—Daniel J. Leach

[57] ABSTRACT

An improved fishing line sinker which contains at least two additional passages forming passages inclined downwardly in the body of the sinker in addition to the loop passages for attaching the sinker to a fishing line. The two additional passages located in the conventional fishing line sinker provide a means for threading the fishing leader line through said sinker body and thereby provide a positioning location of safety for a fishing hook normally attached to the one end on the fishing line leader as the hook end of the fishing hook is placed into one or more of the passages. In another embodiment, a cylindrically shaped fishing line sinker containing at least three passages is provided for threading of the fishing leader line to said cylindrical sinker, said cylindrical sinker being made of conventional nonbuoyant material which is plated with chrome or nickel to serve as a jigger in addition to being a sinker; a useful embodiment for particular kinds of fishing.

The combination of hook, line and improved sinker as provided herein is also an embodiment of the invention providing a safe and efficient fishing tackle means whereby during storage and transportation the fishing hook is retained with one of the passages of the sinker body.

3 Claims, 3 Drawing Figures

U.S. Patent
Feb. 6, 1979
4,137,664
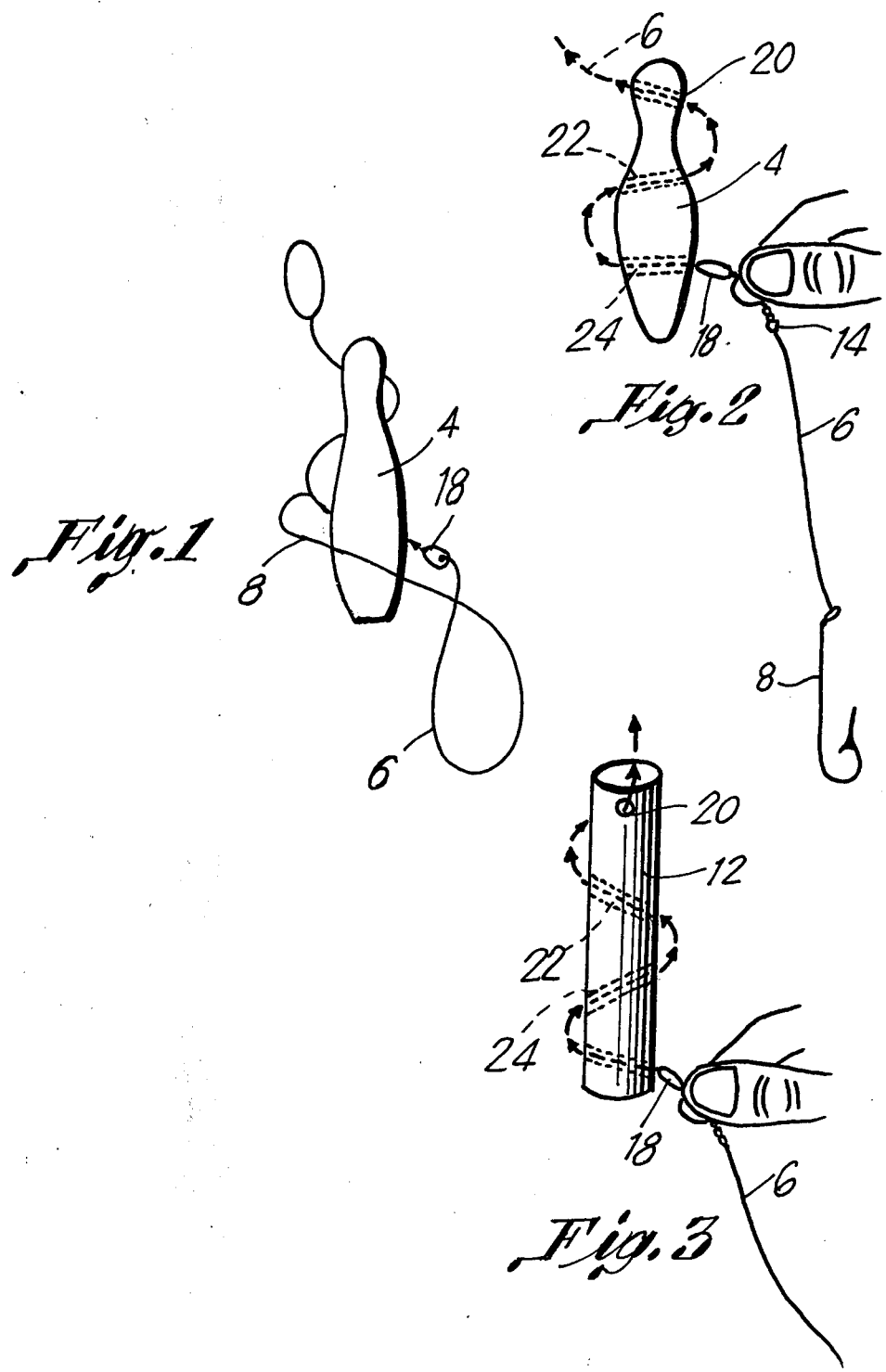

FISHING SINKER

BACKGROUND OF THE INVENTION

This invention relates to fishing equipment, and more particularly to fishing lines and sinkers. In various types of fishing equipment which include fish lines to which nets or hooks are attached for submerging the latter beneath the surface of the water, sinkers are provided for attachment to these lines. While there are many different shapes in the marketplace of conventional sinkers, the most popular models are figure "8" shaped and are normally made from a nonbuoyant material such as lead and the like. The attachment of sinkers to leader lines has heretofore been by means of a loop aperture located at the top of the conventional figure "8" shaped sinkers. Other exotic means of attaching the sinkers to fishing lines without the necessity of parting the lines are adequately described in the prior art.

Certain of these methods include the use of helically coiled springs located at the exterior ends of the sinker and the sinker body contains helical grooves into which the fishing line is inserted and wrapped around and thereafter, wrapped several times in and among the coils of the helical springs located at the exterior portions (U.S. Pat. No. 1,883,574). In other prior art, fishing line sinkers with exterior loop devices are attached to the sinker body and are provided for threading of the fishing line therethrough and thereby fastening the fishing line and sinker to the fishing line (U.S. Pat. No. 2,663,113).

It is an object of the present invention to provide a fishing sinker which is readily fastened to the fishing line, and which will also serve as a container for a fishing hook when the fishing line, sinker and hook are not in use such as in the transportation of same to and from the fishing site.

In various other prior art devices, fishing sinkers have employed the use of various hook means for attachment purposes of the fishing sinker to the fishing line. Snap-on hooks are one conventional means as described in U.S. Pat. No. 3,641,669.

FIGS. 1, 2, and 3 show two embodiment of the composite fishing sinker-leader line assembly of the invention.

It has been surprisingly found that by fabricating fishing line sinkers 4 of conventional design, but containing at least two additional passages in the flat plane of said sinkers 4, a method by which a fishing leader line may be attached is facilitated. The fising line may be inserted through the top aperture 20 or loop normally found on conventional sinkers and thereafter threaded through each of the remaining passages in a fashion to permanently affix the sinker to the fishing line. Additionally, the leader line with hook attached can be threaded from the bottom passages up through the loop aperture as a means of attachment of said leader to the sinker body.

In another embodiment, split shot 18 may be used. Attachment of same to the fishing line in a suitable location is carried out to permanently affix the sinker's location at a particular position on the leader line. Additionally, a knot may be tied in the leader line after it has been threaded through the sinker, the knot preventing leader line slippage through said sinker.

In another embodiment, a cylindrically shaped fishing sinker is provided containing a series of passages for means by which the sinker may be fastened to the leader line.

The invention may be easily understood by reference to the Figures which show a conventional design sinker made from a nonbuoyant material such as lead containing two additional passages and further illustrating the threaded fishing line assembly. FIG. 1 shows the conventional design sinker 4 with the threaded leader line 6 and the fishing hook 8 inserted within one of the passages for transportation and storage. FIG. 3 shows the composite assembly with a cylindrically shaped fishing line sinker 12 instead of a sinker 4 with the fishing leader line threaded therethrough. FIG. 2 shows the method of threading the conventional hook 8 and leader line 6 which is fastened to the conventional ring-like device 14 and further attached to additional fishing line to be inserted and threaded through the sinker. FIG. 2 also shows the method of inserting fishing line which is attached to a leader line containing a fishing hook.

It has been found that in locating the passages 22 and 24 on the body of the sinker 4 in the same plane, the sinker 4 provides the unexpected result of freedom of movement of the hook 8 with bait allowing same to float somewhat above the land surface of the lake, river or sea in which the fishing is being carried out. The size of the passages 22 and 24, while not critical, should be at least $\frac{1}{8}$" in diameter and of course, would be of a size sufficient to enable the fisherman to thread various size leader lines 6 therethrough. Sinkers 4 of conventional design are fabricated from all conventional materials, including such nonbuoyant materials as lead and the like. The sinkers 4 of the present invention are to be likewise fabricated. It is also contemplated that the improved fishing line sinkers 4 provided by the present invention may be useful in both salt water and fresh water fishing. The size of the sinkers, of course, will vary, with, as the skilled art worker knows, the kind of fishing to be undertaken.

The passages 22 and 24 location, as stated above, is not critical. However, it is preferred that the passages 22 and 24 be located in the same plane; on the conventional sinker 4 it has been found that it is the plane of the broadest surface of the sinker that provides the best freedom of movement for the hook 8 and bait during fishing.

The safety feature provided by the present invention should be of considerable importance to fisherman who could fabricate leader lines 6 containing the inventive sinkers 4 with various size hooks 8, thereafter the hooks 8 could be safely stored within one or more of the passages of the inventive sinkers for storage in the fishing tackle box, transportation to the site and safety in fixing one or more of the hook, line and sinker combinations to the fishing lines.

The passages 22 and 24, best seen in FIG. 3, are formed by the passages 22 and 24 and located on an incline in the same vertical plane. The upper or first passage 22 is inclined downwardly at an angle to both the horizontal and vertical axes of the sinker 4. The lower or second passage 24 is also inclined at an angle to both the horizontal and vertical axes of the sinker 4 but is oriented such that the top of the opening of passage 24 is on the same side of the sinker 4 as the bottom of the passage opening 22. Thus, the passages 22 and 24 are oppositely directed to facilitate slidable movement of the leader line 6 through the passages.

What is claimed is:

1. An assembly for use on a fishing line comprising:

(a) a sinker having a first passage through the body of the sinker which first passage is inclined downwardly at an angle to both the horizontal and vertical axes of the sinker;

(b) a second passage through the body of the sinker located in the same vertical plane as the first passage, which second passage is inclined downwardly at an angle to both the horizontal and vertical axes of the sinker in an orientation wherein the upper end of the second passage is on the same side of the sinker as the lower end of the first passage;

(c) an additional passage at the upper end of the sinker, distinct from the two passages in the sinker, for slidably attaching the sinker to a fishing line;

(d) a leader line slidably threaded through the first passage in the sinker from the top of the passage to the bottom and through the second passage from the top of the passage to the bottom;

(e) a fishing hook fixedly attached to the leader line remote from the sinker beyond the second downwardly inclined passage; and (f) a split shot releasably attached to the leader line between the fishing hook and the sinker, which split shot can be fixed to the leader line at a variety of locations and whereby the location of the split shot on the leader line determines the distance of the fishing hook from the sinker.

2. An assembly as in claim 1 wherein the passages in the body of the sinker are sized to accommodate the point of the fishing hook.

3. An assembly as in claim 2 wherein the passages in the body of the sinker are about one-eighth inch in diameter.

* * * * *

UNITED STATES PATENT AND TRADEMARK OFFICE
CERTIFICATE OF CORRECTION

PATENT NO. : 4,137,664
DATED : Feb. 6, 1979
INVENTOR(S) : William J. Beres

It is certified that error appears in the above-identified patent and that said Letters Patent are hereby corrected as shown below:

In the Abstract, line 10, change "line leader" to -- leader line --;

line 43, change "with" to -- within --;

Column 1, line 23, change "embodiment" to -- embodiments --;

line 50, change "fising" to -- fishing --.

Signed and Sealed this

Twenty-sixth Day of June 1979

[SEAL]

Attest:

RUTH C. MASON
Attesting Officer

DONALD W. BANNER
Commissioner of Patents and Trademarks